US010678688B2

(12) United States Patent
Kang et al.

(10) Patent No.: US 10,678,688 B2
(45) Date of Patent: *Jun. 9, 2020

(54) SEMICONDUCTOR DEVICE

(71) Applicant: Samsung Electronics Co., Ltd., Suwon-si, Gyeonggi-do (KR)

(72) Inventors: SukYong Kang, Suwon-si (KR); Han-Gi Jung, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/206,247

(22) Filed: Nov. 30, 2018

(65) Prior Publication Data
US 2019/0102294 A1 Apr. 4, 2019

Related U.S. Application Data

(62) Division of application No. 14/990,858, filed on Jan. 8, 2016, now Pat. No. 10,185,661.

(30) Foreign Application Priority Data
Jan. 8, 2015 (KR) .................. 10-2015-0002517

(51) Int. Cl.
G06F 13/28 (2006.01)
G06F 12/0802 (2016.01)
G06F 13/16 (2006.01)

(52) U.S. Cl.
CPC ...... *G06F 12/0802* (2013.01); *G06F 13/1694* (2013.01)

(58) Field of Classification Search
CPC ............ G06F 12/0802; G06F 13/1694; G06F 13/1673; G11C 8/10; G11C 7/1084
USPC ........................................ 711/119
See application file for complete search history.

(56) References Cited

U.S. PATENT DOCUMENTS

| 4,485,264 | A | 11/1984 | Izu et al. |
| 5,294,808 | A | 3/1994 | Lo |
| 6,178,126 | B1 * | 1/2001 | Kirihata ............ G11C 29/72 365/200 |
| 7,154,316 | B2 | 12/2006 | Park |
| 7,433,263 | B2 | 10/2008 | Kim |
| 7,624,225 | B2 | 11/2009 | Gower et al. |
| 7,636,271 | B2 | 12/2009 | Johnson |
| 7,688,666 | B2 | 3/2010 | Choi et al. |
| 7,716,443 | B2 | 5/2010 | Seo et al. |
| 8,194,492 | B2 | 6/2012 | Wang et al. |

(Continued)

FOREIGN PATENT DOCUMENTS

KR 2002-0066761 A 8/2002

*Primary Examiner* — Huan Hoang
(74) *Attorney, Agent, or Firm* — Harness, Dickey & Pierce, P.L.C.

(57) ABSTRACT

A semiconductor device includes a decoder configured to receive an extended mode register set (EMRS) code including specific information, and decode the received EMRS code to acquire the specific information; a peripheral controller configured to generate a control signal based on the specific information; and a peripheral region including a plurality of buffers, the plurality of buffers being configured to be controlled by the control signal, wherein the specific information includes information indicating an expected bandwidth of input data that is to be input to one of the plurality of buffers.

12 Claims, 15 Drawing Sheets

(56) References Cited

U.S. PATENT DOCUMENTS

| | | |
|---|---|---|
| 8,576,645 B2 | 11/2013 | Kim |
| 8,737,143 B2 | 5/2014 | Kondo |
| 8,799,730 B2 | 8/2014 | Oh et al. |
| 8,804,453 B2 | 8/2014 | Ko et al. |
| 10,185,661 B2 * | 1/2019 | Kang .................. G06F 13/1694 |
| 2002/0023191 A1 | 2/2002 | Fudeyasu |
| 2007/0069213 A1 | 3/2007 | Lee et al. |
| 2008/0059822 A1 * | 3/2008 | Choi .................... G06F 1/3203 713/320 |
| 2009/0161447 A1 | 6/2009 | Ha et al. |
| 2009/0240903 A1 | 9/2009 | Sauber et al. |
| 2012/0081988 A1 | 4/2012 | Kim et al. |
| 2014/0078840 A1 | 3/2014 | Seo et al. |

* cited by examiner

FIG. 5

TABLE 1

| C1 | C2 | C3 | SPEED BIN |
|----|----|----|-----------|
| 0  | 0  | 0  | 1600      |
| 0  | 0  | 1  | 1866      |
| 0  | 1  | 0  | 2133      |
| 0  | 1  | 1  | 2400      |
| 1  | 0  | 0  | 2666      |
| 1  | 0  | 1  | 2933      |
| 1  | 1  | 0  | 3200      |
| 1  | 1  | 1  | 4000      |

FIG. 6

TABLE 2

| C1 | C2 | DPC(DIMM PER CHANNEL) |
|---|---|---|
| 0 | 0 | 1 |
| 0 | 1 | 2 |
| 1 | 0 | 3 |
| 1 | 1 | RFU |

1400

SEMICONDUCTOR DEVICE

CROSS-REFERENCE TO RELATED APPLICATION

This application application is a divisional of and claims priority under 35 U.S.C. §§ 120/121 to U.S. patent application Ser. No. 14/990,858, filed on Jan. 8, 2016, which claims priority from Korean Patent Application No. 10-2015-0002517 filed on Jan. 8, 2015 in the Korean Intellectual Property Office, and all the benefits accruing therefrom under 35 U.S.C. 119, the entire contents of each of which are incorporated herein by reference.

BACKGROUND

1. Field

The present disclosure relates to a semiconductor device.

2. Description of the Related Art

As the speed bin, e.g., the data rate of volatile memories such as a double data rate (DDR)—synchronized dynamic random access memory (SDRAM) is ever increasing, the speed range to be covered becomes wider. In addition, for server-class dynamic random access memories (DRAMs), it is necessary to effectively respond to conditions on channels such as the DIMM per channel (DPC). For these reasons, it becomes more and more difficult to design memories to be optimized or, alternatively, improved for all of various speed bins and channel conditions used in DRAMs.

Accordingly, there is a growing need for a solution to address such optimization issues.

SUMMARY

Aspects of at least some example embodiments of the inventive concepts provide a semiconductor device in which information on external environment of a memory, i.e., speed bin information or dual in-line memory module (DIMM)-related information is provided to the memory by means of an extended mode register set (EMRS) code to thereby optimize or, alternatively, improve the memory.

It should be noted that objects of at least some example embodiments of the inventive concepts are not limited to the above-described object, and other objects of at least some example embodiments of the inventive concepts will be apparent to those skilled in the art from the following descriptions.

According to at least some example embodiments of the inventive concepts, a semiconductor device includes a decoder configured to, receive an extended mode register set (EMRS) code including specific information, and decode the received EMRS code to acquire the specific information; a peripheral controller configured to generate a control signal based on the specific information; and a peripheral region including a plurality of buffers, the plurality of buffers being configured to be controlled by the control signal, wherein the specific information includes information indicating an expected bandwidth of input data that is to be input to one of the plurality of buffers.

The peripheral controller may be configured to generate the control signal such that the control signal activates a first buffer from among the plurality of buffers, the first buffer being a buffer that corresponds to the expected bandwidth of the input data.

The semiconductor device may be configured to receive the EMRS code from a memory controller or a processor.

The plurality of buffers may include input buffers or output buffers.

According to at least some example embodiments of the inventive concepts, a semiconductor device includes a processor; and storage storing code that, when executed by the processor, causes the processor to, generate an extended mode register set (EMRS) code including specific information; and transfer the EMRS code to a memory, wherein the specific information comprises speed bin information of the memory.

The memory may be included in at least one dual in-line memory module (DIMM) from among a plurality of DIMMs, and the specific information may further include at least one of information on the number of the DIMMs per channel, information regarding which DIMM is inserted into which slot, or information on ranks of the DIMMs.

According to at least some example embodiments of the inventive concepts, a semiconductor device includes a memory controller configured to generate an extended mode register set (EMRS) code such that the EMRS incudes specific information; and a memory including a plurality of buffers, the memory being configured to, receive the EMRS code, select, based on the specific information, at least one buffer from among the plurality of buffers, and activate the selected at least one buffer.

The memory controller may be configured to generate the EMRS code such that the specific information indicates a bandwidth of data to be sent to the memory.

The memory may include buffer characteristic information indicating data bandwidth capabilities of buffers from among the plurality of buffers, and the memory may be configured to perform the selection such that the selected at least one buffer has data bandwidth capabilities that correspond to the bandwidth of data indicated by the specific information.

The memory may be configured to obtain the specific information by decoding the received EMRS code.

The memory may include a first table that maps n-bit codes to corresponding memory characteristic information, and the memory may be configured to, perform a comparison operation based on at least a portion of the EMRS code and the first table, and obtain, as the specific information, the memory characteristic information identified by the table as corresponding to the at least a portion of the EMRS code.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 5 and 6 are diagrams for illustrating tables included in the decoder of FIG. 3;

DETAILED DESCRIPTION OF EMBODIMENTS

Figure 1:
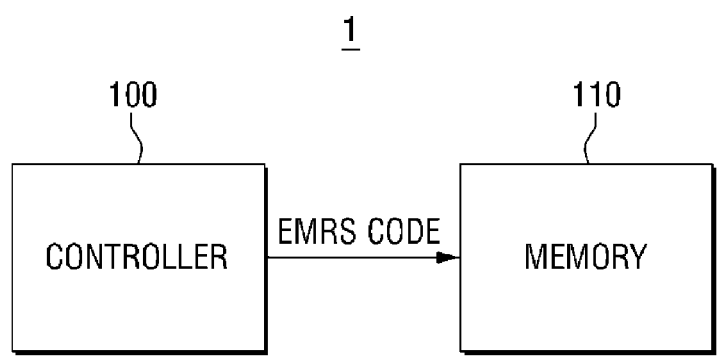
FIG. 1 is a block diagram schematically illustrating a semiconductor device according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Hereinafter, a semiconductor device according to at least one example embodiment of the inventive concepts will be described with reference to FIGS. 1 to 4.

Figure 2:
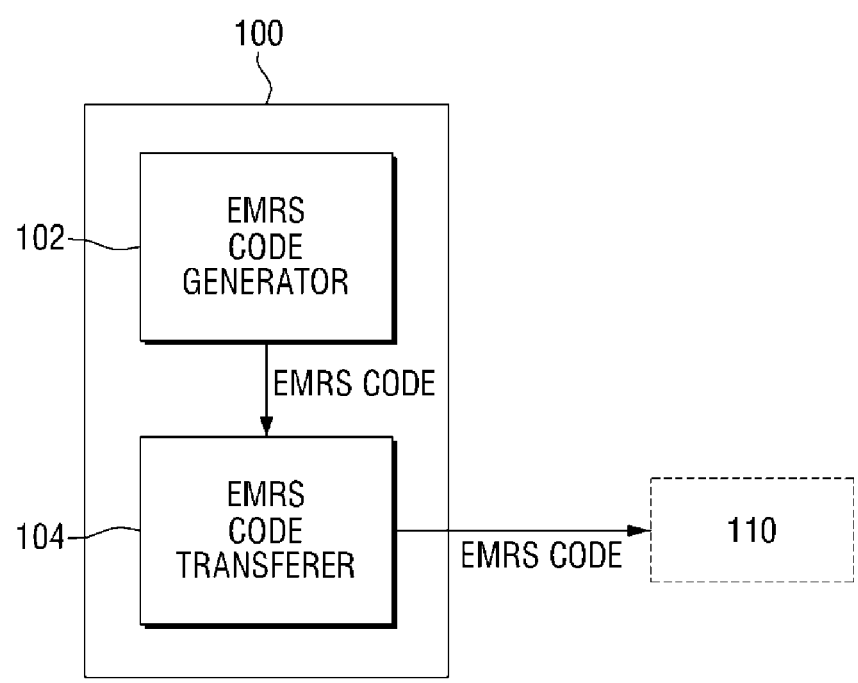
FIG. 2 is a block diagram schematically illustrating a controller of FIG. 1.
Figure 3:
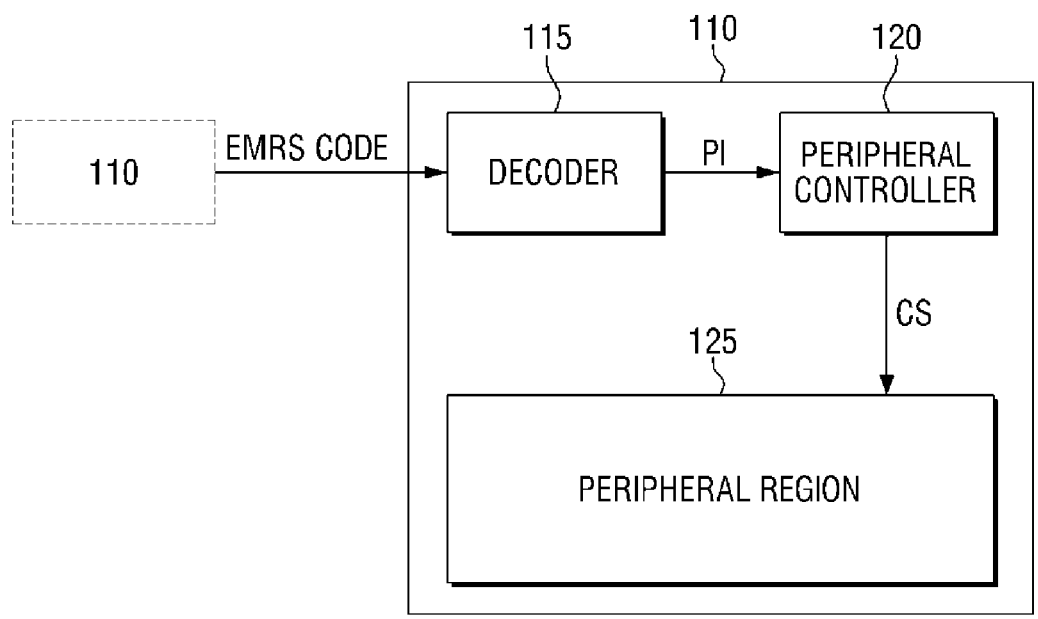
FIG. 3 is a block diagram schematically illustrating a memory of FIG. 1.
Figure 4:
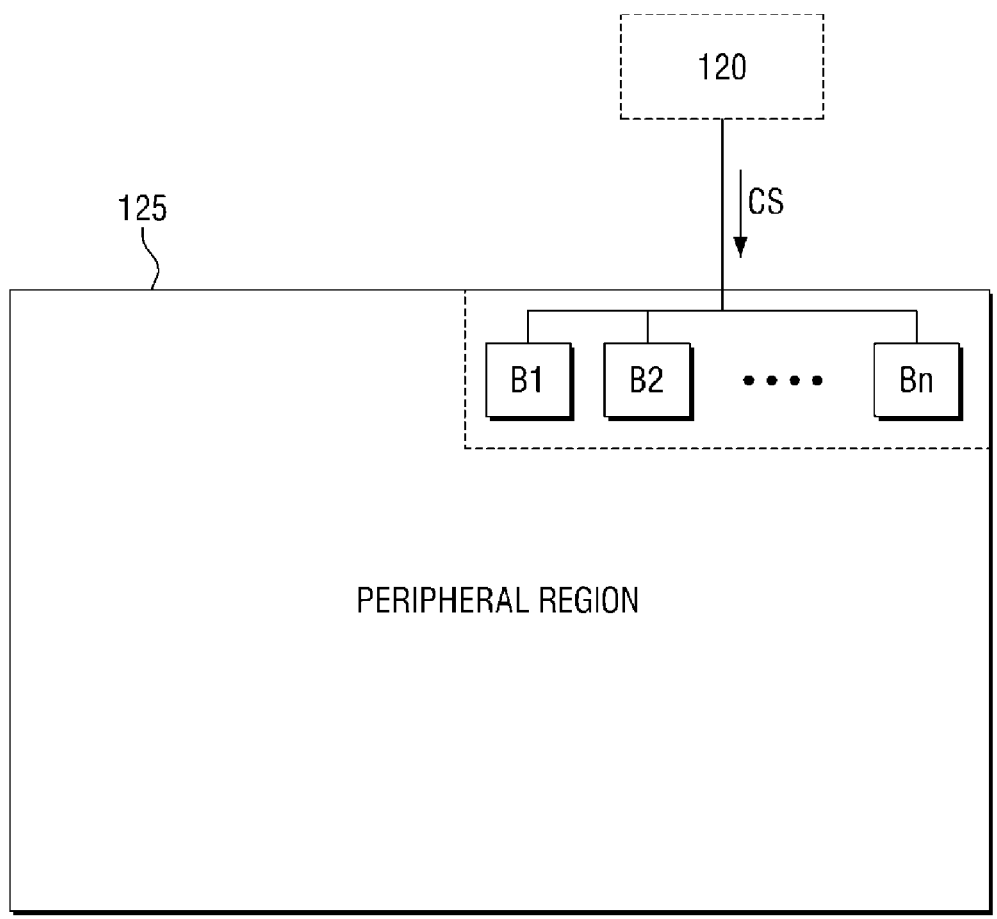
FIG. 4 is a block diagram schematically illustrating a peripheral region of FIG. 3.

FIG. 1 is a block diagram schematically illustrating a semiconductor device according to at least one example embodiment of the inventive concepts. FIG. 2 is a block diagram schematically illustrating a controller of FIG. 1. FIG. 3 is a block diagram schematically illustrating a memory of FIG. 1. FIG. 4 is a block diagram schematically illustrating a peripheral region of FIG. 3.

Referring to FIG. 1, a semiconductor device 1 according to at least one example embodiment of the inventive concepts may include a controller 100 and memory 110.

Specifically, the controller 100 may generate an extended mode register set (EMRS) code to provide it to the memory 110.

As used herein, the EMRS code refers to a code to set an operating mode of the memory 110. More specifically, the EMRS code may refer to, for example, a code to set special operating modes other than general operating modes of the memory 110. Setting the general operating modes of the memory 110 may include, for example, selection of a column address strobe (CAS) latency, a burst length, and the like. Setting the special operating mode may include, for example, a selection of driver strength (DS), a temperature compensated self refresh (TCRS) mode, a partial array self refresh (PASR) mode, or the like.

The controller 100 may include a memory controller or a processor. The processor may include, but is not limited to, a CPU (Central Processing Unit) or GPU (Graphic Processing Unit). The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA).

The memory 110 may receive specific information from the EMRS code.

Specifically, the memory 110 may receive the EMRS code from the controller 100 along with specific information contained in the EMRS code. Further, the memory 110 may be included in a Dual In-line Memory Module (DIMM), which will be described below in detail.

Additionally, the memory 110 may include, but is not limited to, a DRAM.

Referring to FIG. 2, the controller 100 may include an EMRS code generator 102 and an EMRS code transferer 104. The EMRS code generator 102 and the EMRS code transferer 104 may be implemented as software, hardware or a combination of software and hardware. For example, according to at least one example embodiment of the inventive concepts, one or both of the EMRS code generator 102 and the EMRS code transferer 104 may be implemented as a circuit or circuitry specifically structured to perform the operations described herein as being performed by one or both of the EMRS code generator 102 and the EMRS code transferer 104. Additionally, or alternatively, according to at least one example embodiment of the inventive concepts, one or both of the EMRS code generator 102 and the EMRS code transferer 104 may be implemented by a processor (e.g., a processer included in the controller 100) executing instructions (e.g., code of a program) corresponding to the operations described herein as being performed by one or both of the EMRS code generator 102 or the EMRS code transferer 104.

Specifically, the EMRS code generator 102 may generate an EMRS code bearing specific information and may provide the generated EMRS code to the EMRS code transferer 104.

The specific information may include, for example, at least one of: speed bin information of the memory 110, information on the number of DIMMs per channel, information regarding which DIMM is inserted into which slot, and information on the ranks of the DIMMs. In addition, the specific information may be determined by a user. A detailed description thereof will be described below.

The EMRS code transferer 104 may transfer the EMRS code to the memory 110.

Specifically, the EMRS code transferer 104 may receive an EMRS code bearing specific information from the EMRS code generator 102 to transfer it to the memory 110.

Referring to FIG. 3, the memory 110 may include a decoder 115, a peripheral controller 120, and a peripheral region 125. The decoder 115 and peripheral controller 120 may each be implemented as software, hardware or a combination of software and hardware. For example, according to at least one example embodiment of the inventive concepts, one or both of the decoder 115 and peripheral controller 120 may be implemented as circuits or circuitry specifically structured to perform the operations described herein as being performed by one or both of the decoder 115 and peripheral controller 120. Additionally, or alternatively, according to at least one example embodiment of the inventive concepts, one or both of the decoder 115 and peripheral controller 120 may be implemented by a processor executing instructions (e.g., code of a program) corresponding to the operations described herein as being performed by the decoder 115 or the peripheral controller 120.

Specifically, the decoder 115 may receive an EMRS code bearing specific information and may decode the received EMRS code to acquire the specific information. Specifically, the decoder 115 may receive the EMRS code bearing specific information from the controller 100, e.g., the EMRS code transferer 104. Further, the decoder 115 may provide the acquired specific information PI to the peripheral controller 120.

The peripheral controller 120 may generate a control signal CS based on the acquired specific information PI. Specifically, the peripheral controller 120 may receive the acquired specific information PI from the decoder 115 and generate the control signal CS based on the received specific information PI.

Additionally, the peripheral controller 120 may provide the control signal CS to the peripheral region 125. The control signal CS may activate one of a plurality of buffers (B1 to Bn in FIG. 4) included in the peripheral region 125 to be described below, that is optimized for or, alternatively, sufficiently suitable for the characteristics indicated by the acquired specific information PI. For example, according to at least one example embodiment of the inventive concepts, the peripheral controller 120 may include buffer characteristic information identifying varying characteristics of different buffers from among the plurality of buffers (e.g., varying data rate capabilities associated with the different buffers). The peripheral controller 120 may use the buffer characteristic information to select a suitable or, alternatively, optimal buffer, from among the plurality of buffers, based on the specific information included in the EMRS code. The peripheral controller 120 may generate the control signal CS such that the selected buffer is activated. According to at least some example embodiments, the peripheral controller 120 may generate the control signal CS such that only the selected buffer, from among the plurality of buffers, is activated. While the example above is explained with respect to a scenario where only one buffer is selected, according to at least some example embodiments, one or more suitable buffers may be selected, and the peripheral controller 120 may generate the control signal CS such that only the one or more selected buffers, from among the plurality of buffers, are activated.

In addition, although not shown in the drawings, the decoder 115 may provide the acquired, specific information PI to a core region controller (not shown) instead of the peripheral controller 120. The core region controller (not shown) may generate a control signal based on the received, specific information to control a core region (not shown).

However, for the convenience of illustration, descriptions will be made only with respect to the peripheral controller 120 and the peripheral region 125.

Referring to FIG. 4, the peripheral region 125 may include the plurality of buffers B1 to Bn controlled by the control signal CS.

The plurality of buffers B1 to Bn may be input buffers or output buffers. In the example illustrated in FIG. 4, the plurality of buffers B1 to Bn in the peripheral region 125 is controlled by the control signal CS. However, this is merely illustrative, but not limiting.

Namely, in addition to the plurality of buffers B1 to Bn, units included in other regions of the peripheral region 125 may be controlled by the control signal CS.

According to at least the present example embodiment of the inventive concepts, the EMRS code bearing specific information is transferred from the controller 100 to the memory 110, and the EMRS code is decoded by the decoder 115 in the memory 110, so that the specific information is acquired.

However, at least the present example embodiment of the inventive concepts is not limited thereto. A user may store in advance the correspondence between the EMRS code and specific information in the decoder 115 as a table (e.g., a lookup table (LUT)). Specifically, the decoder 115 may receive an EMRS code and then may compare the received EMRS code with the table to acquire specific information matched to the EMRS code. This will be described in detail with reference to FIGS. 5 and 6.

FIGS. 5 and 6 are diagrams for illustrating tables included in the decoder of FIG. 3.

FIG. 5 illustrates Table 1 that defines the correspondence between the EMRS code and speed bin information of the memory (110 of FIG. 1).

Specifically, Table 1 may define the correspondence between the EMRS code and speed bin, e.g., expected bandwidth or data rate of input data that is input to one of the plurality of buffers (B1 to Bn in FIG. 3) included the peripheral region (125 in FIG. 3) of the memory. Accordingly, the speed bin information of a memory may refer to an expected bandwidth or data rate of input data that is to be input to one of the plurality of buffers of the memory.

In the example shown in FIG. 5, the EMRS code may include, for example, n-digit binary codes, where n is an integer equal to or larger than 3, and Table 1 may use the three-digit binary codes, i.e., C1, C2 and C3 to define the correspondence between the EMRS code and the speed bin. However, according to at least some example embodiments, n may be any number greater than 0.

Specifically, if the speed bin has the range from 1,600 to 4,000, Table 1 may use the three-digit binary codes to divide the range of the speed bin into eight sub-ranges. The units of the values illustrated in Table 1 may be, for example, MB/s.

Namely, a set of values "0, 0, 0" of C1, C2 and C3 of the EMRS code, respectively, corresponds to speed bin of 1,600. A set of values "1, 1, 1" of C1, C2 and C3 of the EMRS code, respectively, corresponds to speed bin of 4,000.

Likewise, speed bin values above 1,600 and below 4,000 may correspond to sets of values of C1, C2 and C3 from "0, 0, 1" to "1, 1, 0," respectively.

It is to be understood that Table 1 is not limited to have the values of C1, C2 and C1 in ascending order from "0, 0, 0" to "1, 1, 1" and the values of speed bin increasing accordingly from 1,600 to 4,000 as shown in FIG. 5.

Alternatively, Table 1 may have the values of C1, C2 and C1 in descending order from "1, 1, 1" to "0, 0, 0" and the values of speed bin decreasing accordingly from 4,000 to 1,600. The correspondence between the EMRS code and the speed bin information in Table 1 shown in FIG. 5 is a merely an example.

Next, referring to FIG. 6, Table 2 is illustrated. Table 2 defines the correspondence between the EMRS code and the number of DIMMs per channel.

Specifically, Table 2 may define the correspondence between the EMRS code and the number of DIMMs (not shown) per channel, e.g., in which the memory (110 of FIG. 1) is included.

In the example shown in FIG. 6, the EMRS code may include, for example, n-digit binary codes. Table 2 may use two-digit binary codes, i.e., C1 and C2 to define the correspondence between the EMRS code and the number of DIMMs per channel.

Additionally, Table 2 may use again the values of C1 and C2 among C1, C2 and C3 used in Table 1, and thus Table 1 may be related with Table 2. A detailed description thereof will be described below.

Specifically, if the number of DIMMs per channel (DPC) ranges from 1 to 3, Table 2 may use the two-digit binary codes to divide the number of the DPC into four number of cases.

Namely, the set of values "0, 0" of C1 and C2 of the EMRS code, respectively, corresponds to the number of DPC of 1. The set of values "1, 1" of C1 and C2 of the EMRS code, respectively, represents reserved for future use (RFU).

It is to be understood that Table 2 is not limited to have the values of C1 and C2 in ascending order from "0, 0" to "1, 1" and the number of DPC from 1 to RFU changing accordingly as shown in FIG. 6. For example, Table 2 may have the values of C1 and C2 in descending order from "1, 1" to "0, 0" and the number of DPC from RFU to 1 accordingly. The correspondence between the EMRS code and the DPC information in Table 2 shown in FIG. 6 is a merely an example.

In addition to Tables 1 and 2, although not shown in drawings, the decoder may further include Table 3 defining correspondence between the EMRS code and information regarding which DIMM is inserted into which slot, and Table 4 defining correspondence between the EMRS code and information on ranks of DIMMs.

Similarly to Tables 1 and 2, Tables 3 and 4 may use some of the n-digit binary codes of the EMRS code to define the correspondences.

Additionally, the tables defining correspondences between the EMRS code and specific information may be defined by a user to be stored in the decoder (115 in FIG. 3) in the memory before the EMRS code is provided to the memory (110 in FIG. 1).

Hereinafter, the relationship among the controller, channels and the memory of FIG. 1 in frequency domain will be described with reference to FIGS. 7 and 8.

Figure 7:
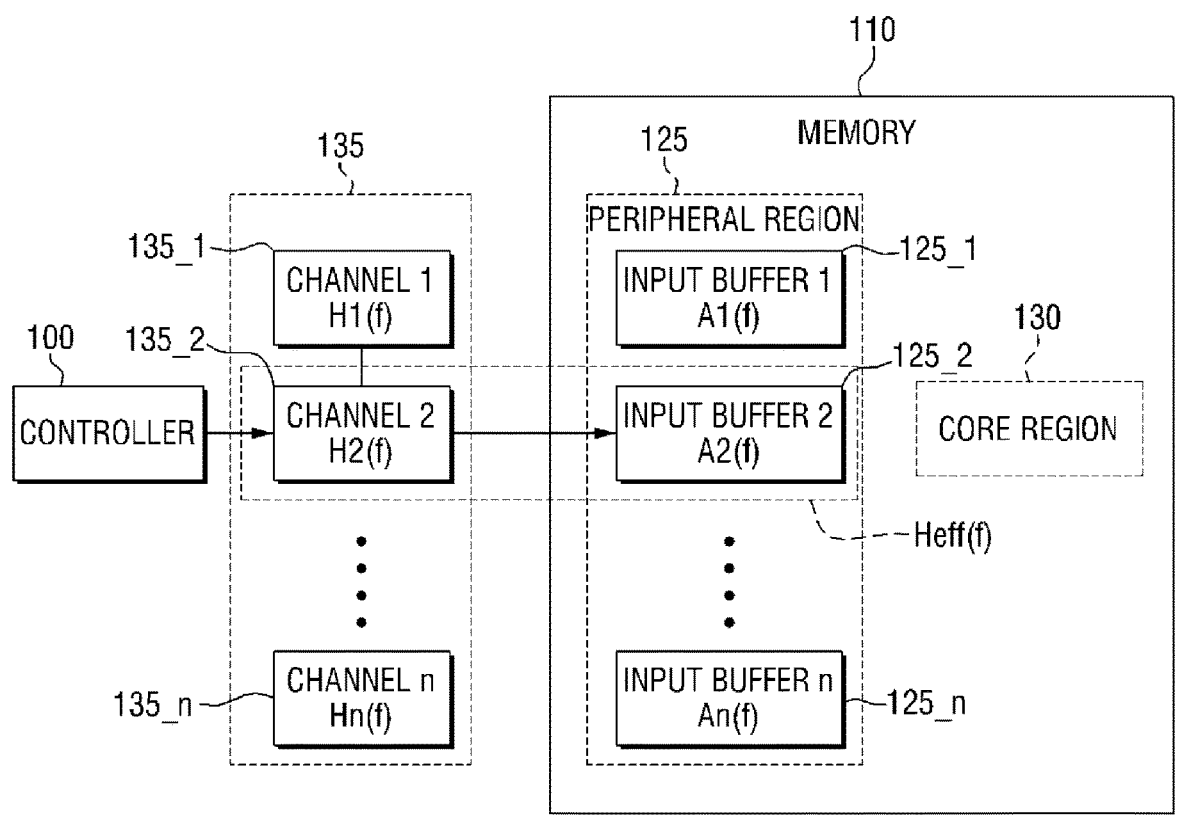
FIGS. 7 and 8 are diagrams for illustrating the relationship among the controller, the channels and the memory of FIG. 1 in frequency domain.
Figure 8:
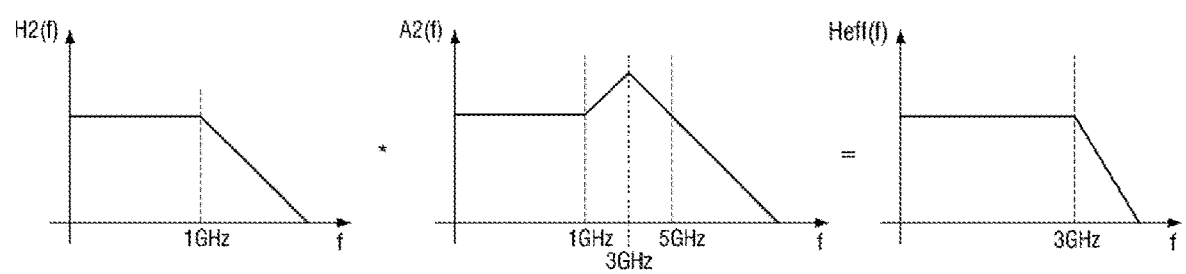

FIGS. 7 and 8 are diagrams for illustrating the relationship among the controller, the channels and the memory of FIG. 1 in frequency domain. In the following description, for the convenience of illustration, the decoder (115 in FIG. 3) and the peripheral controller (120 in FIG. 3) in the memory (110 in FIG. 1) will not be described.

Referring to FIG. 7, the controller 100 may use a plurality of channels 135_1 to 135_$n$ for providing input data to a plurality of buffers in the memory 110, e.g., input buffers 125_1 to 125_$n$. The plurality of input buffers 125_1 to 125_$n$ may be included in the peripheral region 125 of the memory 110.

Although the input buffers 125_1 to 125_$n$ are used as the plurality of buffers in this example, the plurality of buffers may include output buffers (not shown) as well.

Specifically, in an attempt to optimize or, alternatively, improve the AC characteristics of the plurality of input buffers 125_1 to 125_$n$, it may be desirable to learn information on the bandwidths of the channels 135_1 to 135_$n$ and the expected bandwidth (i.e., data rate) of input data in order to determine the positions of zeros and poles.

Referring to FIG. 8, after input data is transferred on a channel and before the input data is provided to an input buffer, the final bandwidth of the input data may be determined by a convolution operation between the channel and the input buffer (for example, $H2(f)*A2(f)=\text{Heff}(f)$, where $H2(f)$ is a function corresponding to channel 1, $A2(f)$ is aa function corresponding to Input Buffer 2, and Heff(f) is the result of the convolutional operation performed on $H2(f)$ and $A2(f)$).

By performing the inverse operation of the above convolution operation, an input buffer can be determined that is optimized or, alternatively, improved for current bandwidth conditions of the channel and the input data. Therefore, in an attempt to optimize or, alternatively, improve the AC characteristics of the plurality of input buffers, it may be desirable to learn information on the bandwidths of the channels and expected bandwidth (i.e., data rate) of input data.

Referring back to FIG. 7, if the controller 100 attempts to provide input data to the memory 110 via a certain channel (e.g., a second channel 135_2), the EMRS code may bear information on the second channel 135_2 (i.e., information on the bandwidth of the second channel 135_2) and information on speed bin of the input data (i.e., expected bandwidth of the input data).

The memory 110 may receive the EMRS code from the controller 100 and may decode it to acquire the information on the second channel 135_2 (i.e., information on the bandwidth of the second channel 135_2) and the information on speed bin of the input data (i.e., expected bandwidth of the input data).

Further, the memory 110 may internally generate a control signal based on the acquired information. The generated control signal may activate a buffer that is optimized or, alternatively, sufficiently suitable for the bandwidth of the second channel 135_2 and the expected bandwidth of the input data.

In FIG. 7, as the input buffer that is optimized or, alternatively, sufficiently suitable for the bandwidth of the second channel 135_2 and the expected bandwidth of the input data, a second input buffer 125_2 is selected to be activated.

Additionally, referring to FIG. 8, if the bandwidth of the second channel 135_2 is 1 GHz and the expected bandwidth of the input data is 3 GHz, the control signal selects the second buffer 125_2 as the input buffer that is optimized or, alternatively, sufficiently suitable for the bandwidth of the second channel 135_2 and the expected bandwidth of the input data in the above-described manner. As a result, it can be seen that the bandwidth of the input data is controlled such that it is 3 GHz which is its expected bandwidth.

According to at least the present example embodiment of the inventive concepts of the present disclosure, the semiconductor device 1 provide the memory 110 with information on the external environment of the memory, i.e., speed bin or DIMM-related information, so that the memory 110 can be optimized or, alternatively, improved adaptively to the range of speed bin to be covered or various requirements on channels (e.g., DPC).

Hereinafter, a semiconductor device according to at least one example embodiment of the inventive concepts will be described with reference to FIG. 9.

Figure 9:
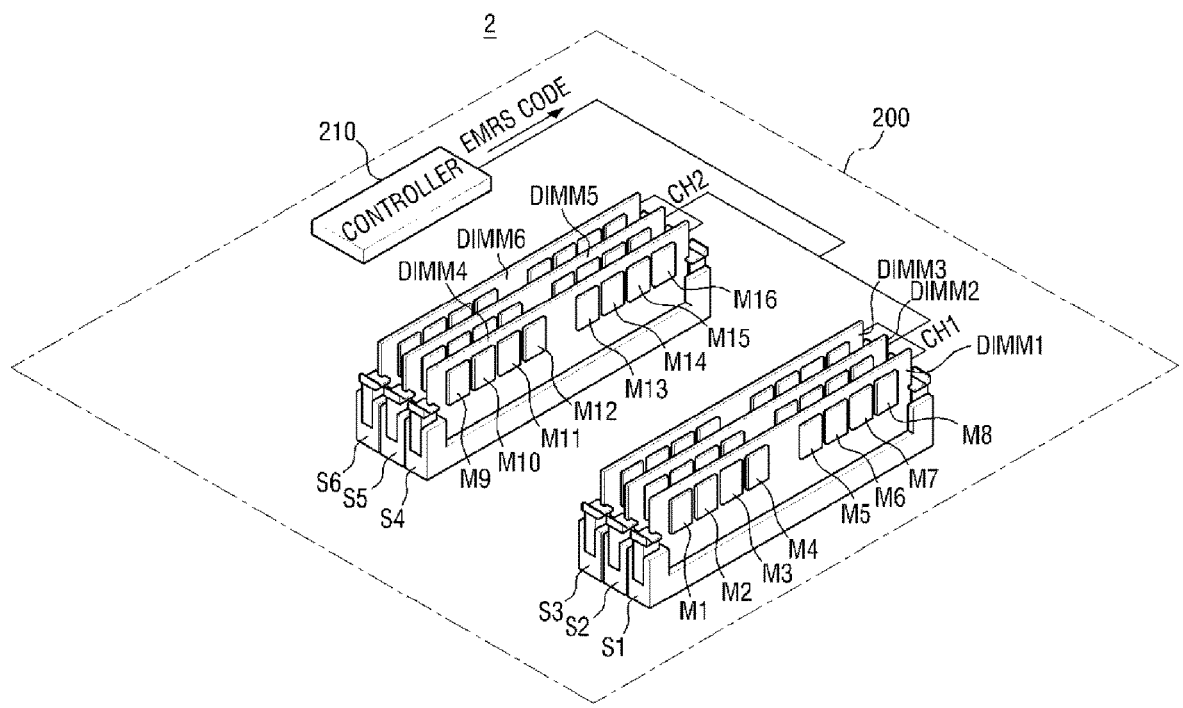
FIG. 9 is a view schematically illustrating a semiconductor device according to at least one example embodiment of the inventive concepts.

FIG. 9 is a view schematically illustrating a semiconductor device according to at least one example embodiment of the inventive concepts.

Referring to FIG. 9, a semiconductor device 2 according to at least the present example embodiment of the inventive concepts of the present disclosure may include a board 200, a controller 210, slots S1 to S6 and DIMMs DIMM1 to DIMM6.

On the board 200, the controller 210 and the slots S1 to S6 may be mounted.

Specifically, the board 200 may be a printed circuit board (PCB) having basic circuitry and components mounted thereon in an expandable electronic device such as a computer. Further, the board 200 sets the execution environment of an electronic device, maintains the information, allows the electronic device to operate stably, and facilitates exchange of data input/output among all elements in the electronic device.

The components mounted on the board 200 may include a processor, a memory, an expansion slot, a BIOS, a connection circuit or the like. Additional components may be added to the board 200 using the expansion slot. The board 200 will not be described in more detail herein.

The controller 210 may be mounted on the board 200 and may generate an EMRS code.

Specifically, the controller 210 may generate an EMRS code bearing specific information to provide it to memories included in DIMMs DIMM1 to DIMM6.

In addition, the controller 210 may include a memory controller or a processor, for example. The processor may include, but is not limited to, a CPU (Central Processing Unit) or GPU (Graphic Processing Unit).

Herein, the specific information may include, for example, at least one of: speed bin information of the memories M1 to M16 included in the DIMMs DIMM1 to DIMM6, information on the number of DIMMs per channel, information regarding which DIMM is inserted into which slot, and information on the ranks of the DIMMs.

Specifically, the speed bin information of the memories M1 to M16 included in the DIMMs DIMM1 to DIMM6 may be, for example, speed bin information of the fourth memory M4 included in the first DIMM DIMM1. The information on the number of the DIMMs per channel may be, for example, information on the number of DIMMs allocated to the first channel (CH1). Further, the information regarding which DIMM is inserted into which slot may be, for example, information regarding which one of the first to third slots S1 to S3 the first to third DIMMs DIMM1 to DIMM3 are inserted into, respectively. The information on the ranks of the DIMMs may be, for example, information on the rank of a second DIMM DIMM2.

It is to be understood that these are merely illustrative but are not limiting.

The slots S1 to S6 may be mounted on the board 200. Specifically, two or more slots S1 to S6 may be mounted on the board 200, each of the slots S1 to S6 may have respective DIMMs DIMM1 to DIMM6 inserted thereinto.

Although three slots are allocated to each of the channels CH1 and CH2 in FIG. 9, the number of the slots is not limited to three.

The DIMMs DIMM1 to DIMM6 may be inserted into the slots S1 to S6, respectively, and may receive an EMRS code from the controller 210. Specifically, two or more DIMMs DIMM1 to DIMM6 may exist, and the DIMMs DIMM1 to DIMM6 may be inserted into the slots S1 to S6, respectively.

Although the first to third DIMMs DIMM1 to DIMM3 are allocated to the first channel while the fourth to sixth DIMMs DIMM4 to DIMM6 are allocated to the second channel in FIG. 9, this is merely illustrative.

Namely, only one of the first to third DIMMs DIMM1 to DIMM3 may be allocated to the first channel, and only two of the fourth to sixth DIMMs DIMM4 to DIMM6 may be allocated to the second channel.

Additionally, each of the DIMMs DIMM1 to DIMM6 may include a plurality of memories. Specifically, for the first DIMM DIMM1, for example, the first DIMM DIMM1 may include a plurality of memories, i.e., the first to eighth memories M1 to M8.

It is to be understood that although the first DIMM DIMM1 includes eighth memories in FIG. 9, it is merely illustrative and the first DIMM DIMM1 may include more or less than eight memories.

Although not shown in the drawings, the memories M1 to M16 may be connected to the controller 210 via a bus (not shown). It is to be understood that the first channel CH1 may connect between a memory (for example, the first memory M1) included in the first to third DIMMs DIMM1 to DIMM3 and a bus (not shown), and the second channel CH2 may connect between a memory (for example, the ninth memory M9) included in the fourth to sixth DIMMs DIMM4 to DIMM6 and a bus (not shown).

The memories M1 to M6 included in the first to sixth DIMMs DIMM1 to DIMM6 may be, but are not limited to, DRAMs.

Additionally, a memory, e.g., the first memory M1 included in the first to sixth DIMMs DIMM1 to DIMM6 may perform the same functionality as the memory (110 in FIG. 3) illustrated in FIG. 3. Accordingly, a memory, e.g., the first memory M1 included in the first to sixth DIMM DIMM1 to DIMM6 may receive an EMRS code from the controller 210 and decode it to acquire specific information, thereby activating one of a plurality of buffers included in the first memory M1 that is optimized or, alternatively, sufficiently suitable for the characteristics indicated by the acquired specific information.

Besides, the first memory M1 may include a core region, may decode an EMRS code received from the controller 210 to acquire specific information therefrom, and may use the acquired, specific information to control the core region.

Consequently, the controller of FIG. 1 (100 in FIG. 1) may correspond to the controller 210 of FIG. 9, and the memory of FIG. 1 (110 of FIG. 1) may correspond to each of the memories M1 to M16 of FIG. 9.

Hereinafter, a semiconductor device according to yet at least one example embodiment of the inventive concepts will be described with reference to FIG. 10.

Figure 10:
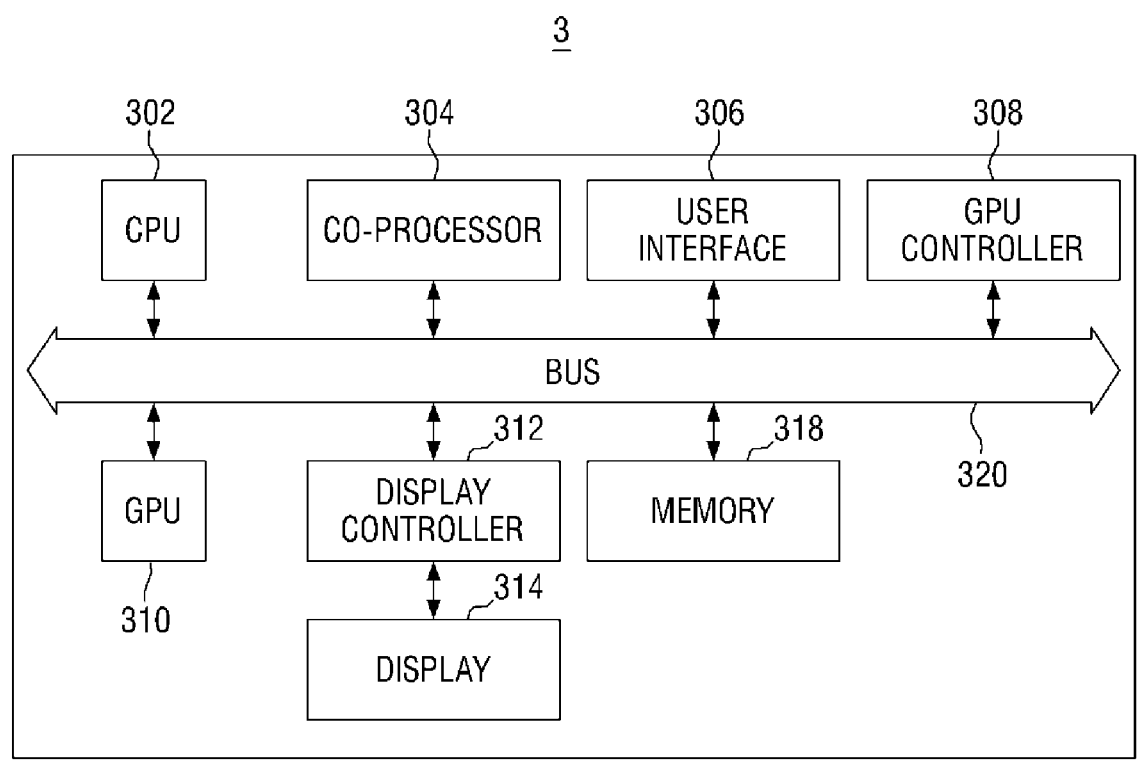
FIG. 10 is a block diagram for illustrating a semiconductor device according to at least one example embodiment of the inventive concepts.

FIG. 10 is a block diagram for illustrating a semiconductor device according to yet at least one example embodiment of the inventive concepts.

Referring to FIG. 10, a semiconductor device 3 may include a CPU (central processing unit) 302, a co-processor 304, a user interface 306, a GPU (graphic processing unit) 310, a display controller 312 and a bus 320. The CPU 302, the co-processor 304, the user interface 306, the GPU 310 and the display controller 312 may communicate with one another via the bus 320. The display controller 312 may control the display 314 and may send/receive data to/from the display 314.

The semiconductor device 3 may further include a GPU controller 308. In addition, the GPU controller 308 may also communicate with the CPU 302, the co-processor 304, the user interface 306, the GPU 310 and the display controller 312 via the bus 320.

The above-described controller of FIG. 1 (100 in FIG. 1) may correspond to the CPU 302, the co-processor 304 and the GPU 310, and the memory of FIG. 1 (110 of FIG. 1) may correspond to the memory 318 of FIG. 10.

Namely, at least one of the CPU 302, the co-processor 304 and GPU 310 may generate an EMRS code bearing specific information to provide it to the memory 318 via the bus 320. The memory 318 may decode the EMRS code to acquire the specific information.

Herein, the specific information may speed bin information of the memory 318 or DIMM-related information, as described above. It is to be understood that the memory 318 may be included in a DIMM (not shown), as described above with respect to FIG. 9.

Hereinafter, a semiconductor device according to at least one example embodiment of the inventive concepts will be described with reference to FIG. 11.

Figure 11:
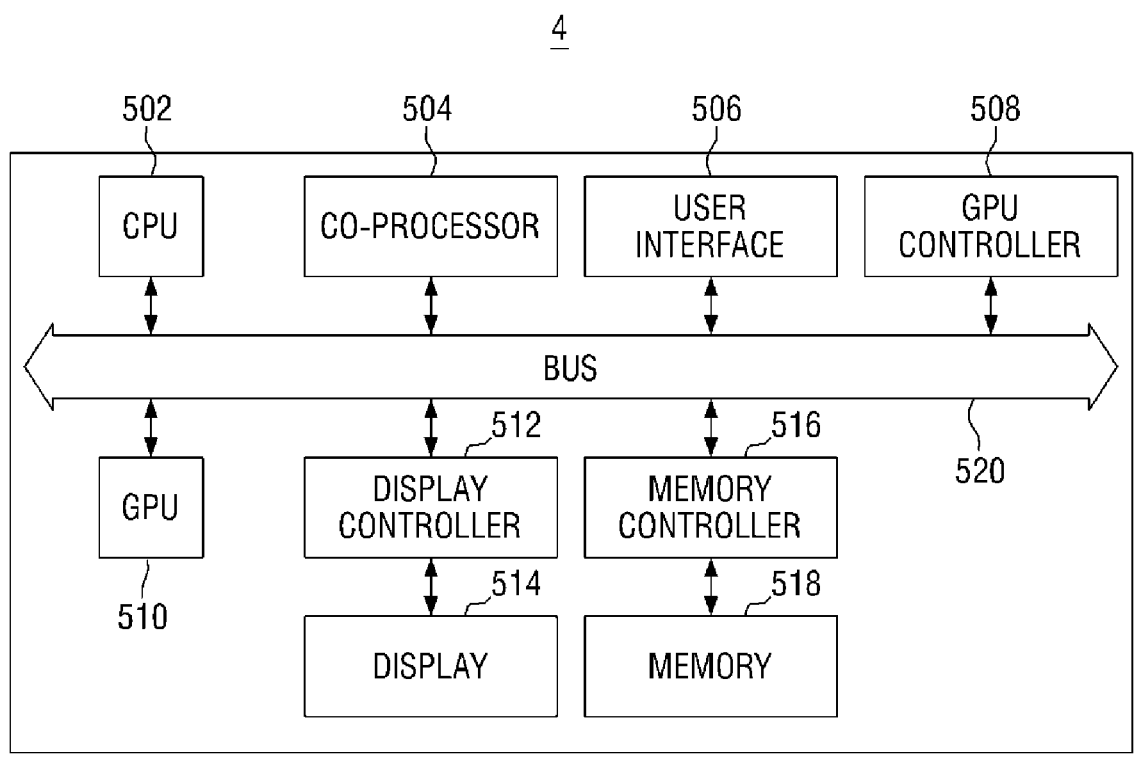
FIG. 11 is a block diagram for illustrating a semiconductor device according to at least one example embodiment of the inventive concepts.

FIG. 11 is a block diagram for illustrating a semiconductor device according to at least one example embodiment of the inventive concepts.

Referring to FIG. 11, a semiconductor device 4 may include a CPU 502, a co-processor 504, a user interface 506, a GPU 510, a display controller 512, a memory controller 516, and a bus 520. The CPU 502, the co-processor 504, the user interface 506, the GPU 510, the display controller 512 and the memory controller 516 may communicate with one another via the bus 520. The display controller 512 may control the display 514 and may send/receive data to/from the display 514.

The semiconductor device 4 may further include a GPU controller 508. In addition, the GPU controller 508 may also communicate with the CPU 502, the co-processor 504, the user interface 506, the GPU 510, the display controller 512 and the memory controller 516 via the bus 520.

However, unlike the semiconductor device 3 in FIG. 10, the semiconductor device 4 in FIG. 11 includes the memory controller 516. Further, unlike FIG. 10, the controller of FIG. 1 (100 in FIG. 1) may correspond to the memory controller 516 of FIG. 11, and the memory of FIG. 1 (110 of FIG. 1) may correspond to the memory 318 of FIG. 10.

Accordingly, the memory controller 516 may generate an EMRS code bearing specific information to provide it to the memory 518. The memory 518 may decode the EMRS code to acquire the specific information.

Herein, the specific information may be speed bin information of the memory 518 or DIMM-related information, as described above. It is to be understood that the memory 518 may be included in a DIMM (not shown), as described above with respect to FIG. 9.

Figure 12:
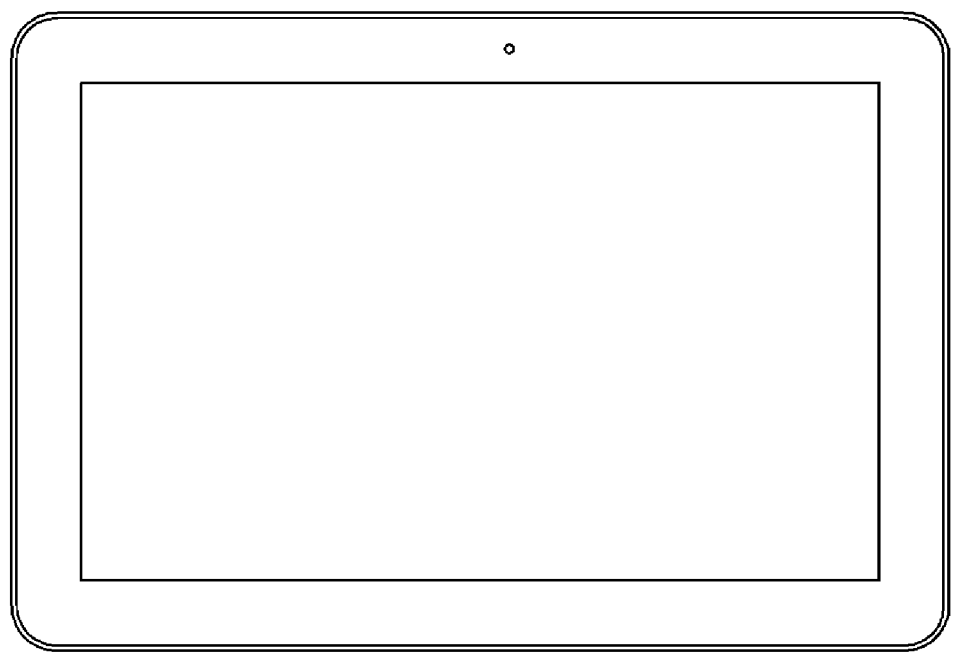
FIGS. 12 to 14 show examples of semiconductor systems that can employ the semiconductor devices according to at least some example embodiments of the inventive concepts.
Figure 13:
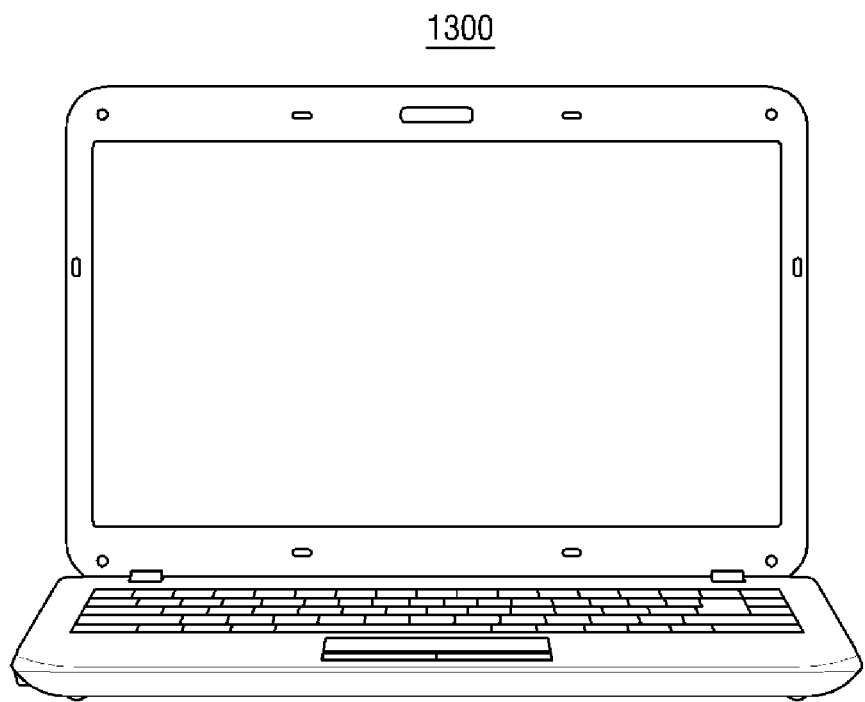
Figure 14:
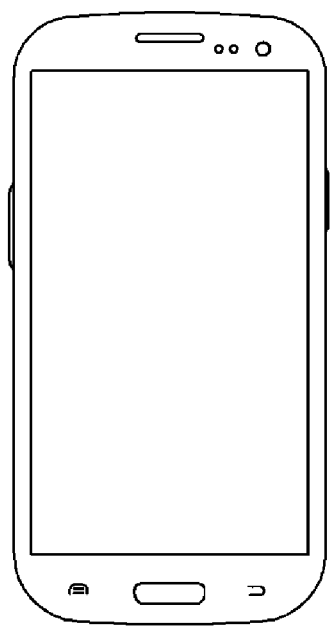

FIGS. 12 to 14 show examples of electronic systems that can employ the semiconductor devices according to at least some example embodiments of the inventive concepts.

FIG. 12 shows a tablet PC 1200, FIG. 13 shows a laptop computer 1300, and FIG. 14 shows a smartphone 1400. The semiconductor devices 1 to 4 according to at least some example embodiments of the inventive concepts may be employed by the tablet PC 1200, the laptop computer 1300, the smartphone 1400, etc.

As will be appreciated by those skilled in the art, the semiconductor devices 1 to 4 according to at least some example embodiments of the inventive concepts may be employed by other integrated circuit devices than those mentioned above. Namely, in the foregoing descriptions, the tablet PC 1200, the laptop computer 1300 and the smartphone 1400 have been mentioned as examples of the electronic system according to at least the present example embodiment of the inventive concepts, the examples of the electronic system are not limited thereto. In at least some example embodiments of the inventive concepts, the electronic system may be implemented as: a computer, UMPC (Ultra Mobile PC), a workstation, a net-book, a PDA (Personal Digital Assistants), a portable computer, a wireless phone, a mobile phone, an e-book, a PMP (portable multimedia player), a portable game console, a navigation device, a black box, a digital camera, a 3-dimensional television, a digital audio recorder, a digital audio player, a digital picture recorder, a digital picture player, a digital video recorder, a digital video player, etc.

Hereinafter, an example operation method of semiconductor device of FIG. 1 will be described with reference to FIG. 15.

Figure 15:
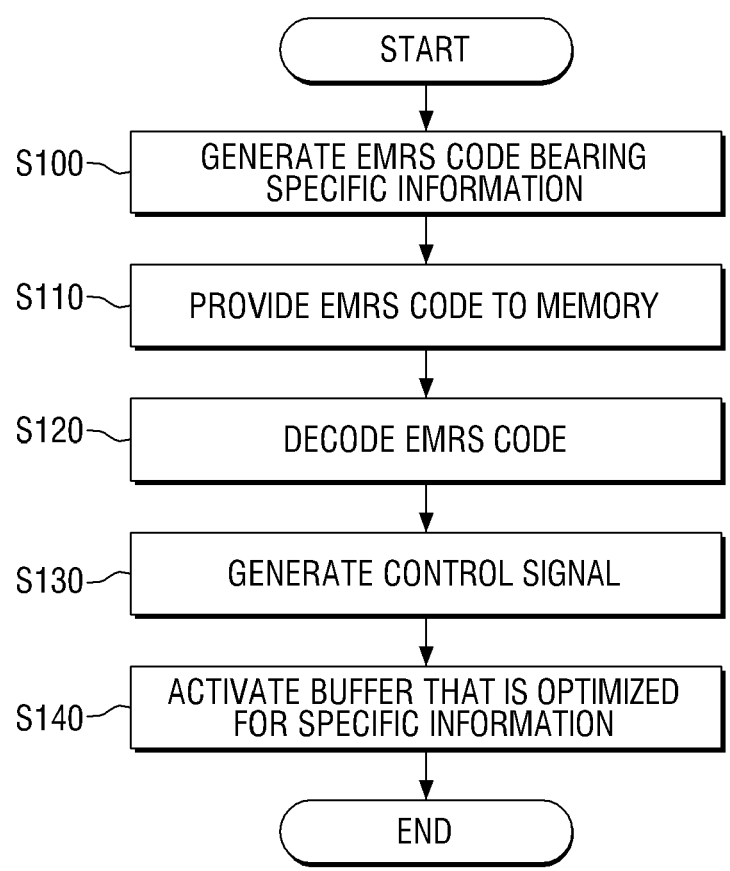
FIG. 15 is a flow chart for illustrating an example operation method of the semiconductor device of FIG. 1.

FIG. 15 is a flow chart illustrating an example operation method of the semiconductor device of FIG. 1.

Referring to FIGS. 1 to 3 and FIG. 15, the controller 100 initially generates an EMRS code bearing specific information (S100).

Specifically, the EMRS code generator 102 may generate an EMRS code bearing specific information. In addition, the EMRS code generator 102 may send the generated EMRS code to the EMRS code transferer 104.

Herein, the specific information may include, for example, at least one of: speed bin information of the memory 110, information on the number of DIMMs per channel, information regarding which DIMM is inserted into which slot, and information on the rank of the DIMMs.

The controller 100 may provide the generated EMRS code to the memory 110 (S110).

Specifically, the EMRS code transferer 104 may provide the EMRS code to the decoder 115 in the memory 110. In doing so, the EMRS code may be provided to the decoder 115 via a channel (not shown) between the controller 100 and memory 110.

The decoder 115 in the memory 110 decodes the EMRS code (S120).

Specifically, the decoder 115 may decode the EMRS code to acquire the specific information. Further, the decoder 115 may provide the acquired, specific information to the peripheral controller 120.

As described above with respect to FIGS. 5 and 6, it is also possible that a table defining correspondence between the EMRS code and the specific information may be stored in the decoder 115 in advance. In this instance, when the decoder 115 receives an EMRS code, it may compare the received EMRS code with the table to acquire specific information matched to the EMRS code.

The peripheral controller 120 generates a control signal (S130).

Specifically, the peripheral controller 120 may generate a control signal CS based on the specific information received from the decoder 115. Additionally, the peripheral controller 120 may provide the control signal CS to the peripheral region 125.

A buffer that is optimized or, alternatively, improved for the specific information is activated (S140).

Specifically, the control signal CS may activate one of a plurality of buffers (B1 to Bn in FIG. 4) included in the peripheral region 125 that is optimized or, alternatively, sufficiently suitable for the characteristics indicated by the for the acquired specific information.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A semiconductor device, comprising:
a processor; and
storage storing code that, when executed by the processor, causes the processor to,
generate an extended mode register set (EMRS) code including first information; and
transfer the EMRS code to a memory,
wherein the first information includes speed bin information of the memory,
wherein the memory is included in at least one dual in-line memory module (DIMM) from among a plurality of DIMMs, and
wherein the first information further includes at least one of information on a number of the DIMMs per channel, information regarding which DIMM is inserted into which slot, or information on ranks of the DIMMs.

2. A semiconductor device, comprising:
a controller configured to generate an extended mode register set (EMRS) code; and
at least one DIMM including a memory receiving specific information from the EMRS code,
wherein the EMRS code is a code to set an operating mode of the memory,
wherein the at least one dual in-line memory module (DIMM) comprises a plurality of DIMMs, and
wherein the specific information includes at least one of: speed bin information of the memory, information on a number of the DIMMs per channel, information regarding which DIMM is inserted into which slot, and information on ranks of the DIMMs,
wherein the memory comprises a peripheral region including a plurality of buffers and the memory is configured to activate a buffer, from among the plurality of buffers, that corresponds to the specific information.

3. The semiconductor device of claim 2, wherein the memory is configured to:
receive the EMRS code and decode the EMRS code to acquire the specific information, and
the activated buffer corresponding to the specific information being a buffer from among the plurality of buffers that is optimized for the acquired, specific information.

4. A semiconductor device, comprising:
a controller mounted on a board and configured to generate an extended mode register set (EMRS) code;
at least one slot mounted on the board; and
at least one dual in-line memory module (DIMM) inserted into the slot, the DIMM including at least one memory connected to the controller via a bus, wherein the memory is configured to receive specific information from the EMRS code,
wherein the EMRS code is a code to set an operation mode of the memory, and
wherein the specific information comprises speed bin information of the memory.

5. The semiconductor device of claim 4, wherein the at least one slot comprises a plurality of slots, and the at least one DIMM comprises a plurality of DIMMs, and
wherein the specific information further comprises at least one of: information on a number of the DIMMs per channel, information regarding which DIMM is inserted into which slot, and information on ranks of the DIMMs.

6. The semiconductor device of claim 5, wherein the channel is configured to connect the bus to the memory.

7. The semiconductor device of claim 4, wherein the at least one memory comprises a plurality of memories, wherein the memories are DRAMs.

8. The semiconductor device of claim 4, wherein the memory comprises a peripheral region including a plurality of buffers.

9. The semiconductor device of claim 8, wherein the memory is configured to: receive the EMRS code, decode it to acquire the specific information, and activate one of the plurality of buffers that meets the acquired, specific information.

10. The semiconductor device of claim 4, wherein the memory includes a core region, and
wherein the memory is configured to: receive the EMRS code and decode it to acquire the specific information, and to control the core region using the acquired, specific information.

11. A semiconductor device, comprising:
a controller; and
a memory connected to the controller via a channel, the memory including a plurality of buffers,
wherein the controller is configured to provide the memory with information on a bandwidth of the channel and an expected bandwidth of input data to be input to one of the plurality of buffers by means of an extended mode register set (EMRS) code, and
wherein the memory is configured to activate one of the plurality of buffers that is optimized for the information on the bandwidth of the channel and the expected bandwidth of the input data.

12. The semiconductor device of claim 11, wherein the plurality of buffers is included in a peripheral region of the memory.

* * * * *